Figure 1:
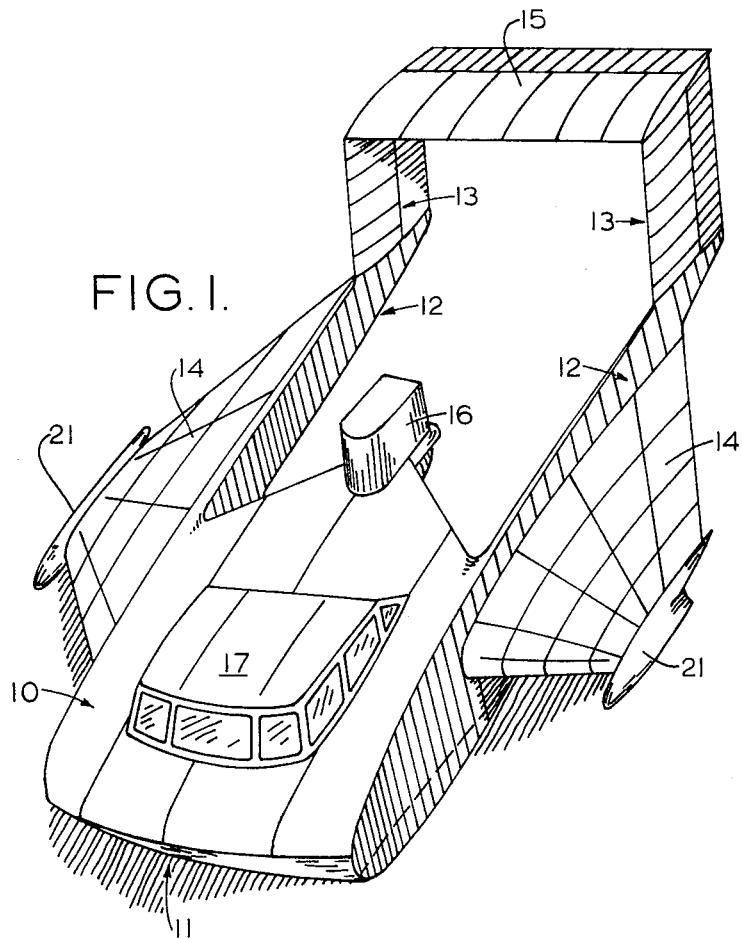

United States Patent

Lippisch

[15] 3,661,111
[45] May 9, 1972

[54] AEROFOILBOAT

[72] Inventor: Alexander M. Lippisch, 1416 Oakland Road, Apt. 6, Cedar Rapids, Iowa 52402

[22] Filed: Oct. 24, 1969

[21] Appl. No.: 869,124

[30] Foreign Application Priority Data

Oct. 25, 1968 Germany.......................P 18 05 171.3

[52] U.S. Cl. .........................................................114/67 A
[51] Int. Cl.................................................................B63b 1/38
[58] Field of Search......................................114/67 A, 66.5 R

[56] References Cited

UNITED STATES PATENTS 1,469,796  10/1923  Lake.......................................114/67 A
3,117,545  1/1964   Warner...................................114/67 A

OTHER PUBLICATIONS

Flight International Supplement, June 25, 1964, pps. 80 and 81

*Primary Examiner*—Andrew H. Farrell
*Attorney*—Warren H. Kintzinger

[57] ABSTRACT

An aerofoilboat shaped with a concavity extending back from the bow, open at the front in the direction of forward motion and generally bounded at the sides and around the rear between the sides by the water surface, and with sufficient forward speed the aerofoilboat being raised and supported above the water surface primarily through an air cushion thereunder built up due to surface ground effect with forward motion of the aerofoilboat. It has a longitudinally shifting center of lift that moved toward the rear in a self adjusting trimming action as the boat moves higher and ground effects lift is lessened.

7 Claims, 6 Drawing Figures

3,661,111

SHEET 1 OF 3

INVENTOR.
ALEXANDER M. LIPPISCH

INVENTOR.
ALEXANDER M. LIPPISCH

INVENTOR.
ALEXANDER M. LIPPISCH

AEROFOILBOAT

This invention relates in general to an aerofoilboat, and in particular, to an aerofoilboat with a concavity beneath open from the bow and bounded below by the water surface and supported thereabove primarily by ground effect with an air cushion built up with normal velocity during operation.

Various air cushion vehicles are known that open toward the front and using a ram air pressure area in the front, or bow, for building up an air cushion exerting a lifting force on the bottom of the vehicle. Some of these vehicles are also equipped with airfoil surfaces, some quite similar to airplane wings producing aerodynamic lift in relation to forward velocity. Consequently vehicles so equipped experience, during forward operational movement, two different types of lifting forces complementing each other with one, being the lifting force of air cushion formed and maintained under the vehicle with continued forward motion, and, with the other, being aerodynamic lifting force developed with the wings as determined by forward vehicle velocity. With some of these existing vehicles the wings and vehicle configuration is such that higher velocities result in the aerodynamic force becoming the greater force and sufficient to at times, cause vehicle take-off and thereby great reduction, if not complete reduction, of the surface, or ground, effect. Thus, special difficulties arise in attempts to attain stabilization of such vehicles in maintaining a precisely defined distance above the water surface in a ground effect mode of operation. With some of the preexisting aerofoilboats propelled by air screws (propellers), and even with some other types of propulsion, there are design requirements and operational characteristics such as make the attainment of heights considerably higher than the extent of ground effect the normal operational realm with greatly decreased air cushion effect if any at all and the lifting force provided entirely, or substantially so, by vehicle wings.

It is therefore, a principal object of this invention to provide an aerofoilboat with stabilized operation maintained substantially entirely within ground effects throughout the full range of forward speeds above lift-off and with the distance from the water surface maintained substantially unchanged throughout this mode of operation independently of forward velocity above lift-off speed.

Another object in such an aerofoilboat is to attain such automatically regulated control of operational height in ground effect over the water surface as to insure more efficient operation, and with water propeller propulsion, insure substantially continuously maintained effective vehicle propulsion propeller immersion in water.

Features of the invention useful in accomplishing these preceding objects include, in an aerofoilboat, a design such as to produce only low lift at the forward portions high in ground effect, or effectively out of ground effect, while the rear sectional portions of the boat including airfoils produce a much greater portion of the total lift exerted on the boat at such higher operational states. This results in a very effective automatic trimming action effectively maintaining operation in ground effect in a beneficially stabilized highly efficient mode of operation normally substantially never permitting free flight as such to be attained. The vehicle is designed for use exclusively on water or in ground effect above the water surface with forward vehicle velocity attained through thrust obtained from water screw (propeller) rotation reaction in water, and with, in some embodiments,some if not all directional control obtained with water rudders. The automatic trimming control of the vehicle in ground effects prevents the boat from taking off so high, even at high speeds, as to result in such lifting of water propeller blading from water as to endanger control and propulsion.

In order to keep the vehicle within the desired zone of surface effect the effective center of total lift exerted on the boat must travel toward the rear as the distance from the water surface is increasing. Ground effect can be utilized by the front parts of the vehicle only through a relatively small distance range above the water surface with effective ground effect lift obtained only in close proximity to the water, while on the other hand, rearward airfoil components of the vehicle produce lift in relation to forward speed. When, at high speeds, the boat rises above the water surface more than close clearance in ground effect, pure ram pressure on the boat bottom decreases rapidly while the lifting force produced by wings and, or tail airfoil is not substantially reduced. This thereby accomplishes the desired rearward trimming action shift of the effective center of lift toward the rear with boat attitude being corrected to maintain the desired effect zone of operation. This inherent design feature with automatic ground effect altitude maintained trimming insures efficient continued water immersion of propeller and rudder.

There are other considerations including location of the power plant and propeller, since at high velocity the wake of the water screw, or screws, produces a high rising powerful spray. Further since engines represent a major portion of the total weight of such vehicles they must be installed close to the center of gravity. This is advantageously, most favorably, accomplished through locating power plants in the middle section of the boat close to the center of gravity. Tail booms are provided extending rearwardly from the central body of the vehicles to mount a horizontal stabilizer plane at extreme rear. These stabilizer elevator surfaces are mounted sufficiently high to be primarily out of ground effect through the full range of vehicle operation, and in addition, to providing a vehicle aerodynamic stabilizing effect they derive lift primarily as an aerodynamic airfoil with forward motion through the air.

With some vehicle embodiments airfoils are provided, concave toward the water surface and convex on the top, attached to opposite sides of the boat toward the rear thereof. Such wings are particularly useful for relatively slower aerofoilboat embodiments, since they advantageously increase the lift of the boat as a whole or, stated another way, attain the required lift for desired operation at lower speeds. At the same time with the rearward location of these added side wings a higher increasing portion of the total lift is provided toward the stern than at the bow with increasing distance above the water thereby attaining the automatic trim return of the boat to desired ground effect zonal operation, relative to the water surface. With some higher speed vehicles the desired stabilizing trimming action is attained in an aerofoilboat without wings other than an elevator stabilizer plane.

Referring to power plant location the most effective is on the central axis of the boat, and in the case of multiple power plants in symmetry close to the central axis. Further, with some embodiments tail booms rise as they extend to the rear to minimize the effect of water spray impingement thereon and to prevent, or minimize, any obstruction to forward propulsion that may arise therefrom.

In the embodiments having rearwardly located wings the wings have lateral and rear edges situated at about the same level as, if not common to, a plane bounding the fuselage (or boat body) at the bottom. With such design ram air pressure is built up not only in the concavity open from the bow of the boat hull or body, but, additionally, under the laterally attached wing surfaces extending towards the rear. Thus, these additional wings serve a double purpose: first, in the build up of air cushions thereunder through ground effect and, secondly, to produce aerodynamic lift independently of surface ram air and ground effect, as in the case with airplane wings. Since the side wing surfaces extend downward to their lateral and rear bounding edges, they form ram pressure areas or pockets thereunder over the water surface, leading to ram air creation of air cushions as vehicle forward velocity is initiated and built up much the same as with concavity of the body extending from the bow thereof. When the aerofoilboat rises from the water surface ram effect derived pressure air begins escaping toward the sides and the back with some lessening of lifting force based on ground effect and some increase in lift derived from increased suction on the top of aerodynamic wing type surfaces along with increased pressure on the bottom surfaces. With lateral lifting surfaces attached to the rear part of a boat body and lifting force therefrom becoming more predominate toward the stern of the vehicle results in return of the boat bow back down to a level low enough above the water surface for ram pressure and ground effect build up in the concavity of the bow to automatically maintain operating trim of the vehicle.

Specific embodiments representing what are presently regarded as the best modes of carrying out the invention are illustrated in the accompanying drawings.

Figure 2:
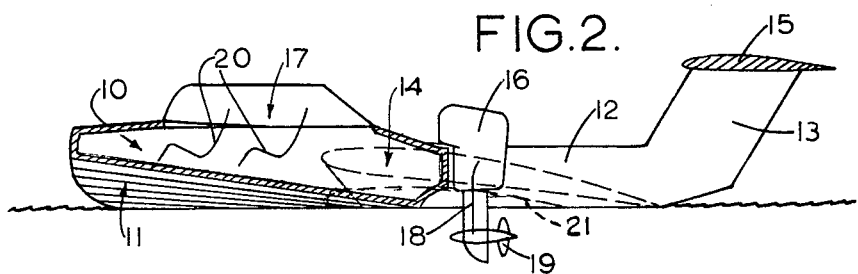
Figure 3:
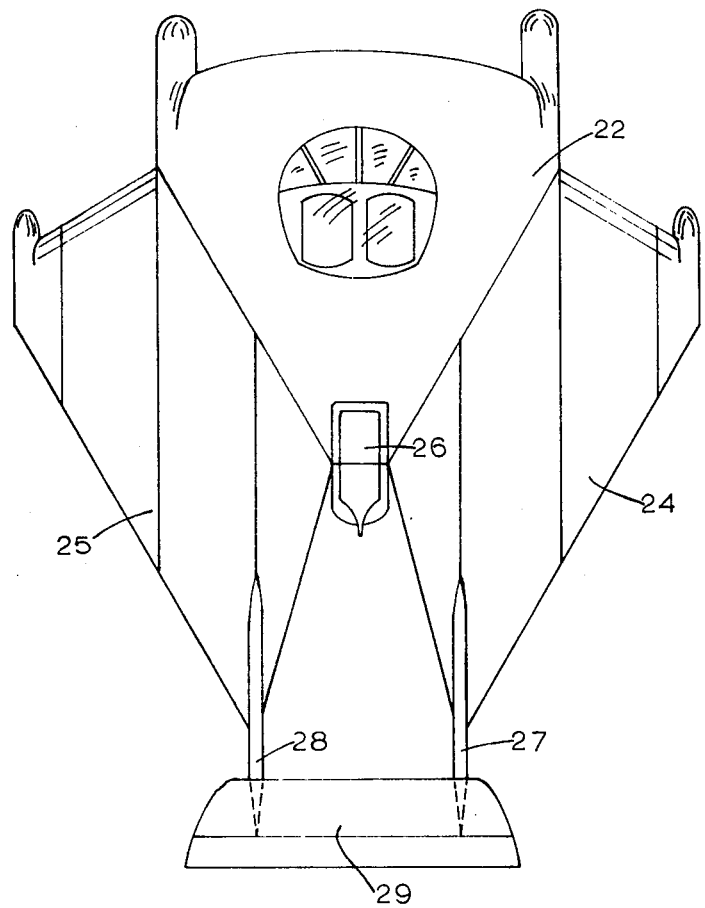
Figure 4:
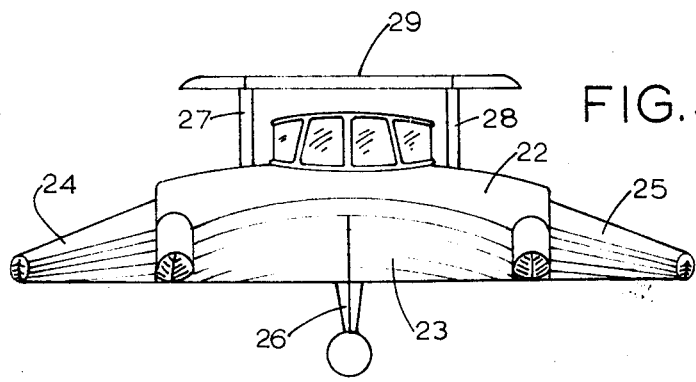
Figure 5:
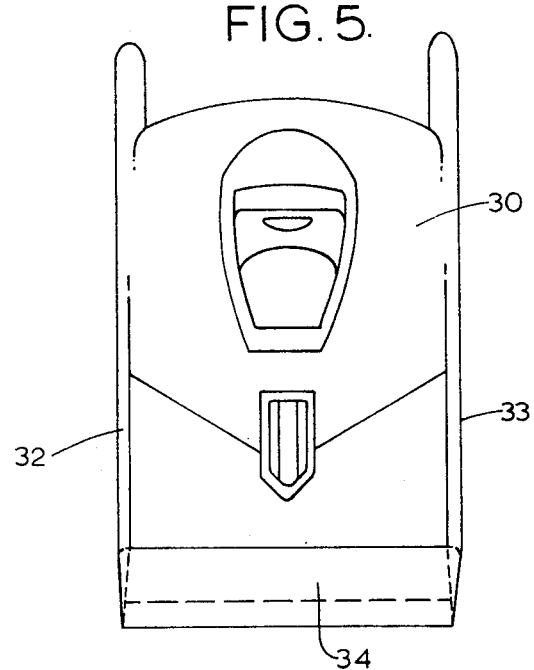
Figure 6:
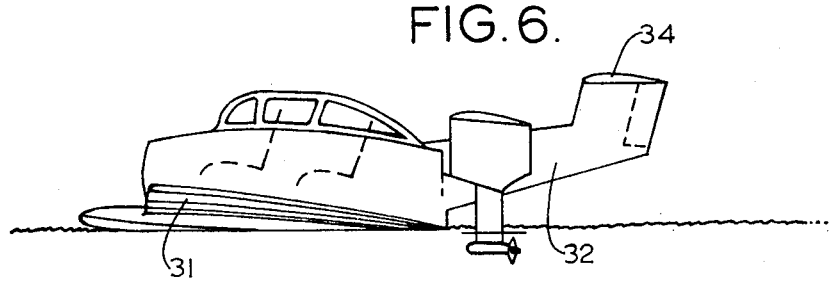

In the drawings:

FIG. 1 represents a perspective view of an aerofoilboat equipped with rearwardly located side wings;

FIG. 2, a longitudinal section of the aerofoilboat of FIG. 1;

FIG. 3, a top plan view of an alternate embodiment of an aerofoilboat from the embodiment of FIG. 1 also employing rearwardly located side wings;

FIG. 4, a front view of the aerofoilboat of FIG. 3;

FIG. 5, a top plan view of another alternate embodiment of an aerofoilboat not employing side wings as with the embodiments of FIGS. 1 and 3; and FIG. 6, a longitudinal section of the aerofoilboat of FIG. 5.

Referring to the drawings:

The aerofoilboat body 10 of FIGS. 1 and 2 is designed with an inclined bottom surface forming a cavity 11 opening toward the front at the body bow. Twin mirror image tail booms 12 attached to body 10 extend therefrom to the rear to carry rearwardly located tail fins 13, and are equipped with side wings 14 extending outwardly from the rear sides of the body and the booms 12. The tail fins 13 advantageously mount, on their upper ends, an interconnecting stabilizer 15 extended therebetween. Between the transverse spacing of the two tail booms 12 and longitudinally between the vehicle body 10 and the stabilizer 15 there is free rearward open area generally accommodating high rising water spray generated by water propellers of such vehicles. The body 10 extends to this open area with a stern end mounting of engine 16 located behind the center of the body 10 and behind a passenger cabin enclosure 17 equipped with seats 20. With this embodiment a combined rudder 18 and propeller 19 drive assembly is used that projects downwardly sufficiently far to insure efficient operational immersion of the propeller 19 and rudder 18 through substantially all normally encountered conditions of operation. Please not that water propeller propulsion may be replaced by other types of propulsion such as, for example, water jet propulsion. The side wing airfoils 14 are attached mainly to the outer sides of the tail booms 12 extending towards the rear of the aerofoilboat. These wing airfoils rise slightly from the rear towards the front, and front to rear vertical sections thereof correspond to like sections through wings of an airplane. The rear edges of these wings 14 skim over the water surface thereby facilitating via the airfoils 14, advantageously fitted with outer end floats 21, the formation of ram pressure areas thereunder at normal cruising speed while the boat is flying in ground effect.

With the aerofoilboat embodiment of FIGS. 3 and 4 a boat body 22 roughly triangular in plan view as viewed from above in FIG. 3 has a bottom concave surface 23 extending from edge to edge at the body front between forwardly extended floats thereof. This bottom concave surface 23 has, generally, the shape of a cone surface section extending from a large end at the front bow end to, substantially, the rear tip end of the body triangular shape. Airfoil wings 24 and 25 are attached to opposite side triangle edges of body 22. A propulsion unit 26 is installed at the rear tip end of the body. Further, vertical tail planes 27 and 28 are mounted on the top rear of airfoil wings 24 and 25, respectively, and are interconnected at their upper ends by stabilizer plane 29 mounted thereon. With some similarity to the embodiment of FIG. 1 the airfoil wings 24 and 25 extend outward and down to outer end floats, and downward to combined outer and trailing edges forming ram air pressure cavities above the water surface.

Referring now to the aerofoilboat embodiment of FIGS. 5 and 6 a boat is presented that is designed for relatively high speed operation without rearward side mounted wings such as used with the embodiments of FIGS. 1 and 3. This high speed embodiment has a relatively wide body 30 with a ram air pressure cavity 31 open from the bow and extended transversely between outer edge forwardly extending floats. The bottom concave surface of cavity 31 forming the vehicle ram air pressure area tapers down to the trailing bottom edge at the rear of body 30. Tail booms 32 and 33, generally in longitudinal plan view alignment with respective opposite body edge forwardly extended floats, rising generally toward the rear are each terminated in a vertical rudder plane. These two rudder planes mount at their tops a relatively highly positioned stabilizer plane 34 spanning the horizontal distance between the two rudder planes. This stabilizer plane 34 develops a sufficient aerodynamic lift increase at the stern of the boat with speed increase to automatically counteract increased pressure trying to lift the boat bow ocurring with increased velocity in automatic trimming efficiently to desired ground effect water surface spacing with no other lifting surfaces required.

Whereas this invention is herein illustrated and described with respect to specific embodiments hereof, it should be realized that various changes may be made without departing from the essential contributions to the art made by the teachings hereof.

I claim:

1. An aerofoilboat, supported above the water by utilizing an air cushion forming due to the ground effect phenomenon: having, a concavity open from the bow in the direction of forward motion of the aerofoilboat, and with the concavity, bounded below, generally, by the water surface; a propulsion unit with at least one propeller positioned for turning in water during operation; with aerofoilboat forward section designed to produce relatively low lift in flight outside of ground effect and provide a ground effect center of lift forward from an aerodynamic component center of lift; with an aerodynamic lift airfoil section of the airfoilboat located toward the rear, producing an increasing portion of the total aerofoilboat lift as the boat moves progressively higher in the ground effect zone of operation, and producing higher lift in flight outside of ground effect; and with said propulsion unit a powerplant positioned in a center cut-out area of the boat close to the center of gravity in the boat's body.

2. The aerofoiboat of claim 1, including airfoils, with convex top surfaces and concave bottom surfaces, attached to the sides of the boat.

3. The aerofoil boat of claim 2, in a high speed configuration including, tail booms extended to the rear; and a stabilizer plane attached to the tail booms.

4. An aerofoilboat, supported above the water by utilizing an air cushion forming due to the ground effect phenomenon; having, a concavity open from the bow in the direction of forward motion of the aerofoilboat, and with the concavity, bounded below, generally, by the water surface; a propulsion unit with at least one propeller positioned for turning in water during operation; with aerofoilboat forward section designed to produce relatively low lift in flight outside of ground effect and provide a ground effect center of lift forward from an aerodynamic component center of lift; with an aerodynamic lift airfoil section of the aerofoilboat located toward the rear, producing an increasing portion of the total aerofoilboat lift as the boat moves progressively higher in the ground effect zone of operation, and producing higher lift in flight outside of ground effect; including airfoils with convex top surfaces and concave bottom surfaces, attached to the sides of the boat; and with said airfoils with lateral and rear edges generally at substantially the level of a common plane with the bottom of the body of the aerofoilboat.

5. The aerofoilboat of claim 4, in a high speed congifuration including, tail booms extended to the rear; and a stabilizer plane attached to the tail booms.

6. The aerofoilboat of claim 1, in a high speed configuration including, tail booms extended to the rear; and a stabilizer plane attached to the tail booms.

7. An aerofoilboat, supported above the water by utilizing an air cushion forming due to the ground effect phenomenon: having, a concavity open from the bow in the direction of forward motion of the aerofoilboat, and with the concavity, bounded below, generally, by the water surface; a propulsion unit with at least one propeller positioned for turning in water during operation; with aerofoilboat forward section designed to produce relatively low lift in flight outside of ground effect and provide a ground effect center of lift forward from an aerodynamic component center of lift; with an aerodynamic lift airfoil section of the aerofoilboat located toward the rear, producing an increasing portion of the total aerofoilboat lift as the boat moves progressively higher in the ground effect zone of operation, and producing higher lift in flight outside of ground effect; in a high speed configuration including, tail booms extended to the rear; and a stabilizer plane attached to the tail booms.

* * * * *